(12) United States Patent
Lavender (10) Patent No.: US 10,393,466 B1
(45) Date of Patent: Aug. 27, 2019

(54) DEVICE AND METHOD FOR FIREARM STABILIZING TRAINING

(71) Applicant: Aaron Lavender, Mesa, AZ (US)

(72) Inventor: Aaron Lavender, Mesa, AZ (US)

( * ) Notice: Subject to any disclaimer, the term of this patent is extended or adjusted under 35 U.S.C. 154(b) by 302 days.

(21) Appl. No.: 15/379,235

(22) Filed: Dec. 14, 2016

Related U.S. Application Data (60) Provisional application No. 62/267,663, filed on Dec. 15, 2015.

(51) Int. Cl.
*F41A 33/00* (2006.01)
*G09B 5/06* (2006.01)
*F41G 1/35* (2006.01)

(52) U.S. Cl.
CPC ............... *F41A 33/00* (2013.01); *F41G 1/35* (2013.01); *G09B 5/06* (2013.01)

(58) Field of Classification Search
CPC .......... F41A 33/00; F41A 33/02; F41A 33/04; F41A 33/06; F41G 1/35; F41G 3/26; G09B 5/06
See application file for complete search history.

(56) References Cited

U.S. PATENT DOCUMENTS

| | | | | |
|---|---|---|---|---|
| 7,272,904 | B2 * | 9/2007 | Larue | F41G 11/003 |
| | | | | 292/145 |
| 2008/0039962 | A1 * | 2/2008 | McRae | F41A 17/06 |
| | | | | 700/90 |
| 2012/0064495 | A1 * | 3/2012 | Tybon | A63B 69/0053 |
| | | | | 434/247 |
| 2012/0090216 | A1 * | 4/2012 | Li | F41G 1/38 |
| | | | | 42/122 |
| 2013/0337415 | A1 * | 12/2013 | Huet | F41G 3/26 |
| | | | | 434/21 |

OTHER PUBLICATIONS http://mantisx.com/pages/how-it-works-1.

* cited by examiner

*Primary Examiner* — Timothy A Musselman
(74) *Attorney, Agent, or Firm* — Booth Udall Fuller, PLC (57) ABSTRACT

A device for stabilizing a firearm or practice weapon while a user practices firing includes a movement sensor, a sensitivity adjuster and a feedback device to emit an audio or visual feedback responsive to the movement when the movement sensed exceeds a threshold level determined by the sensitivity level. The audio or visual feedback may have a feedback characteristic that corresponds to a pattern of the movement.

18 Claims, 8 Drawing Sheets

DEVICE AND METHOD FOR FIREARM STABILIZING TRAINING

CROSS REFERENCE

This application is based on, claims priority to, and incorporates herein by reference in its entirety, U.S. Provisional Patent Application Ser. No. 62/267,663, filed on Dec. 15, 2015, and entitled "Firearm Stabilizing Training Device."

BACKGROUND

1. Technical Field

Aspects of this document relate generally to devices and methods to train stabilizing a firearm before firing the firearm.

2. Background

When using a firearm, new and even experienced firearm users are prone to flinch or jerk just before firing the firearm. The flinch may come as anticipation of the firearm recoil, and may drastically reduce the accuracy of the firearm shot.

It would be desirable to have a device and method for alerting the user about such movements so that the user can train him-/herself to stabilize the firearm before firing the firearm.

SUMMARY

According to one aspect of the disclosure, a device for stabilizing a shooting instrument such as a firearm or practice weapon while a user practices firing the firearm or practice weapon may comprise a movement sensor configured to detect a movement of the device, a sensitivity adjuster operably coupled to the movement sensor and adjustable to allow a user to adjust a sensitivity level of the movement sensor, a feedback device operably coupled to the movement sensor and configured to emit an audio or a visual feedback to the user responsive to the movement while the movement is detected, wherein the feedback device is activated when the movement exceeds a threshold level determined by the sensitivity level and deactivated when the movement falls below the threshold, and wherein the audio or visual feedback comprises a feedback characteristic that corresponds to a pattern of the movement, a feedback adjuster operably coupled to the feedback device and adjustable to allow the user to adjust the feedback characteristic, and a power source electrically coupled to the movement sensor and the feedback device.

Embodiments may comprise one or more of the following features. The feedback characteristic may comprise a volume, a pitch, or a sound pattern of the audio feedback. The feedback characteristic may comprise at least one of a brightness, an intensity, a color, and a light pattern of the visual feedback. The feedback adjuster may comprise a sound adjuster, and the feedback characteristic may comprise at least one of a volume, a frequency, and a tone of the audio feedback. A charging port, wherein the charging port is removably coupled to an external power source, and electrically coupled to the movement sensor, the feedback device, and the power source, and the power source stores an energy received through the charging port. Opposing protrusions extending from the device having shapes that allow the protrusions to be fitted onto a Picatinny rail of the firearm or practice weapon, wherein the device is mounted onto the firearm or practice weapon by placing the protrusions on opposing sides of the Picatinny rail and, after being mounted, the device is restricted from moving relative to the Picatinny rail by a securing element extending through the device adjacent to at least one of the protrusions. A clamp, wherein the clamp comprises protrusions extending inward from clamp arms, a biased pivoting element coupled between at least one of the clamp arms and an actuating element, wherein shapes of the protrusions allow the protrusions to be fitted onto a Picatinny rail of the firearm or practice weapon, when the device is mounted, the device is restricted from moving relative to the Picatinny rail by inward forces exerted upon the Picatinny rail by the biased pivoting element through the at least one of the clamp arms. A wireless communication device coupled to the motion sensor. A mode switch, wherein the movement sensor is activated when the mode switch is set at a practice mode, and the movement sensor is deactivated when the mode switch is set at a game mode, wherein the audio feedback or the visual feedback is emitted in a randomized interval or a predetermined interval. A sight laser coupled to the power source. A level sensor operably coupled to the movement sensor to deactivate the movement sensor when an angle of the device is outside a predetermined incline angle range. An incline angle adjustor operably coupled to the level sensor and adjustable to allow the user to adjust the predetermined incline angle range. The device may be configured to be deactivated when the movement sensor detects no movement for a predetermined period of time or a second period of time set by the user.

According to an aspect of the disclosure, a device for stabilizing a firearm or practice weapon while a user practices firing the firearm or practice weapon may comprise a movement sensor configured to detect a movement of the device, and a feedback device operably coupled to the movement sensor and configured to emit at least one of an audio and a visual feedback to the user responsive to the movement while the movement is detected, wherein the feedback device is activated when the movement exceeds a predetermined threshold, and is deactivated when the movement falls below the predetermined threshold, and the at least one of the audio and the visual feedback comprises a feedback characteristic that corresponds to a pattern of the movement, and wherein the movement sensor and the feedback device are configured to receive power from a power source.

Embodiments may comprise one or more of the following features. A clamp, wherein the clamp comprises protrusions on clamp arms joined through an inwardly biased pivoting element, and a clamp actuating element, and shapes of the protrusions allow the protrusions to be fitted onto a Picatinny rail of the firearm or practice weapon. A sight laser configured to couple to the power source. A level sensor operably coupled to the movement sensor to deactivate the movement sensor when an angle of the device is outside a predetermined incline angle range. The device may be configured to be deactivated when the movement sensor detects no movement for a predetermined period of time or a second period of time set by the user. A charging port, wherein the charging port is configured to removably couple to an external power source, and is electrically coupled to the movement sensor, the feedback device, and the power source, the device further comprising a rechargeable power source configured to store energy received through the charging port.

According to an aspect of the disclosure, a method of training a user to stabilize a shooting instrument while the user shoots with the shooting instrument may comprise sensing movement of the shooting instrument through a stabilizing training device coupled to the shooting instrument, determining whether the sensed movement of the shooting instrument exceeds a predetermined threshold, activating a feedback device operably coupled to the movement sensor to emit at least one of an audio and a visual feedback to the user while the movement is sensed, responsive to the sensed movement exceeding the predetermined threshold, and deactivating the feedback device to cease emission of the at least one of the audio and the visual feedback to the user if the sensed movement falls below the predetermined threshold, wherein the at least one of the audio and the visual feedback comprises a feedback characteristic that corresponds to a pattern of the movement.

According to an aspect of the disclosure, a method of training a user to stabilize a shooting instrument while the user shoots with the shooting instrument may comprise mounting a stabilizing training device onto the shooting instrument, aiming the shooting instrument at a target, maintaining a posture of holding the shooting instrument while aiming at the target, repeating aiming until the stabilizing training device does not alert the user about an undesired movement of the shooting instrument, shooting with the shooting instrument, and adjusting a sensitivity level of the stabilizing training device and repeating the previous steps.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
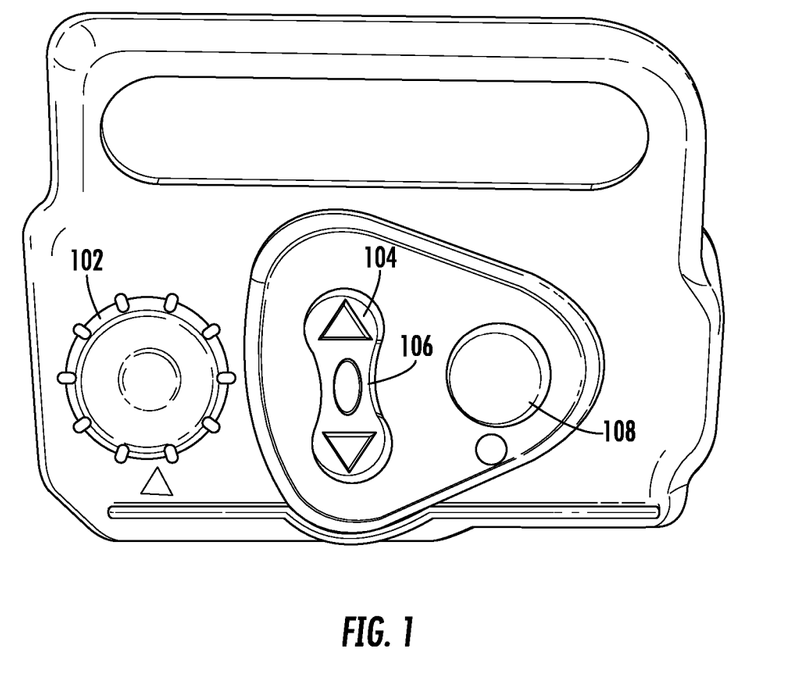
FIG. 1 is a front view of a firearm stabilizing training device.
Figure 2A:
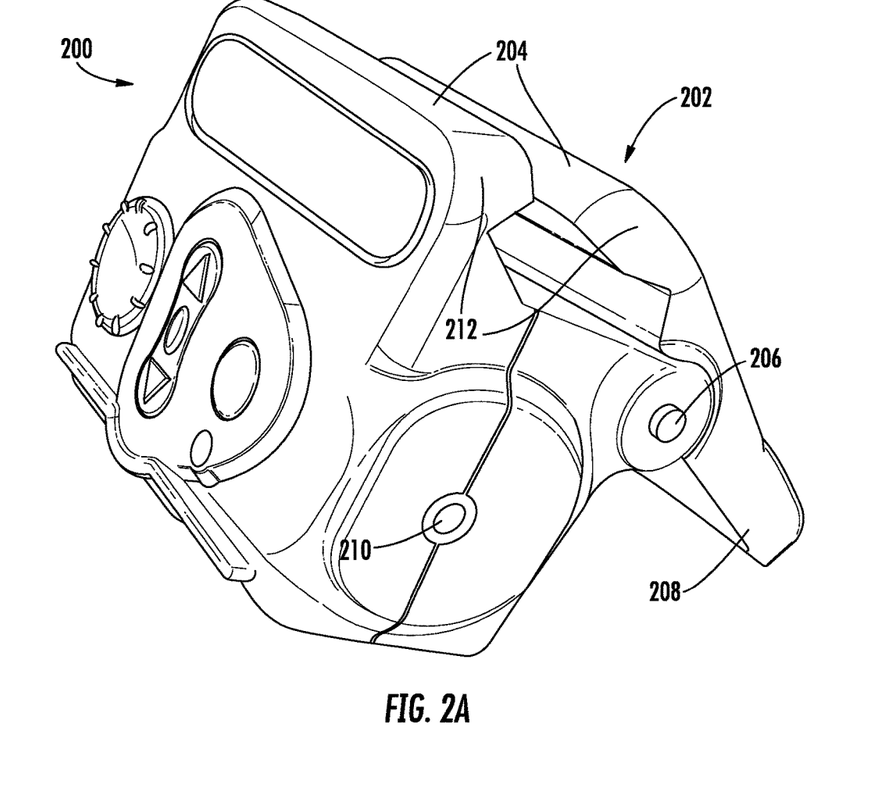
FIG. 2A is a perspective view of a firearm stabilizing training device with the front of the device facing left and the clamp closed.
Figure 2B:
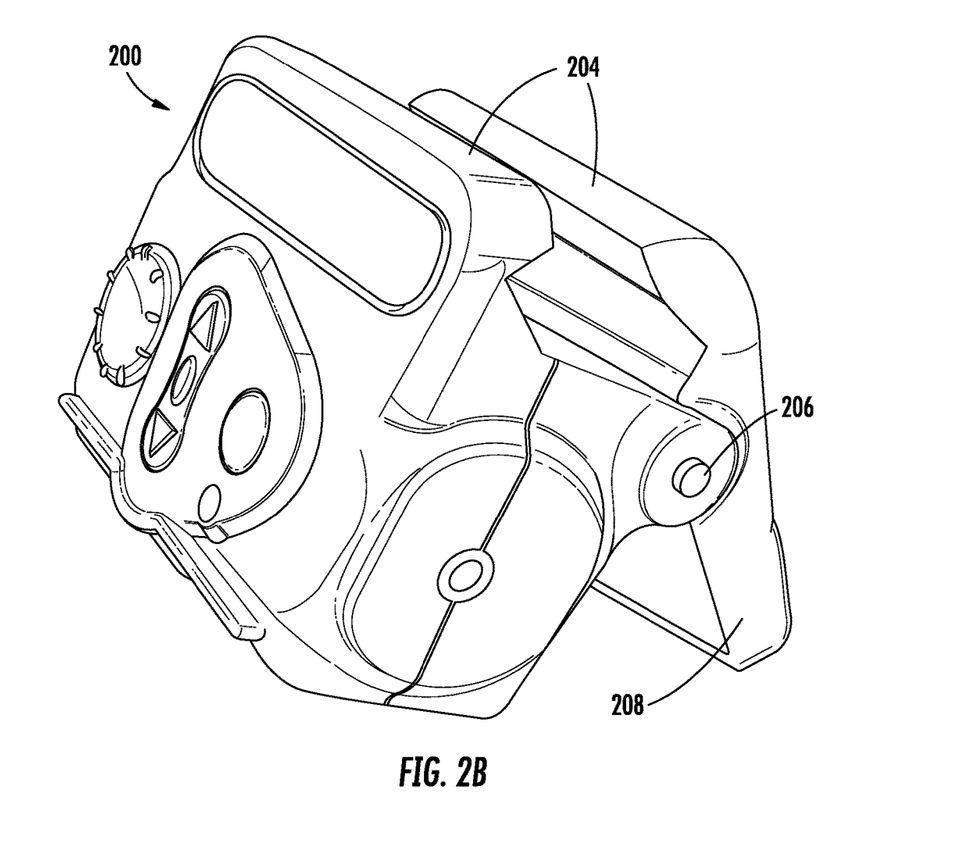
FIG. 2B is a perspective view of a firearm stabilizing training device with the front of the device facing left and the clamp open.
Figure 3:
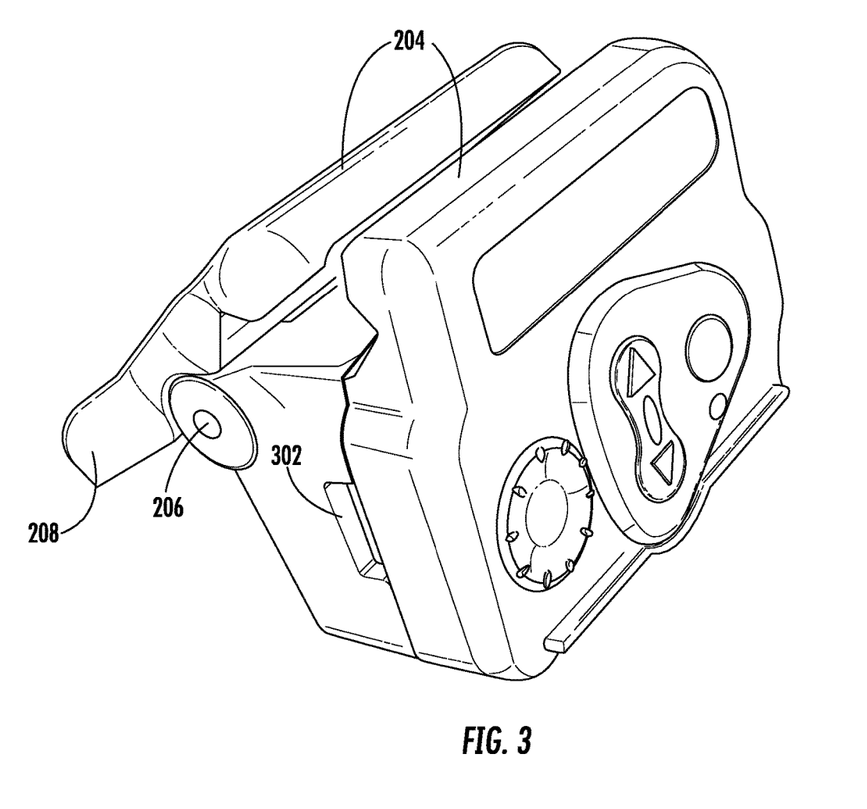
FIG. 3 is a perspective view of a firearm stabilizing training device with the front of the device facing right.

Contemplated in this disclosure are devices and methods for training a user to stabilize a firearm before firing. When used properly and consistently, a firearm stabilizing training device of this disclosure is expected to improve the marksmanship of the user. More specifically, embodiments of the firearm stabilizing training device function to train a user in the use of a firearm through audio and/or visual feedback from the training device through a movement sensor configured to alert a user of movement of the firearm prior to firing. Front view and perspective views of a non-limiting example of a device implemented according to this disclosure are shown in FIGS. 1, 2, and 3. As shown in the non-limiting embodiment of FIG. 5, a firearm stabilizing training device may be removably mounted to the Picatinny rail of the firearm mount (also called the MIL-STD-1913 rail), alternatively, it may be removably mounted to a Weaver rail. This removable coupling of the firearm stabilizing training device to the firearm allows the firearm stabilizing training device to detect movement of the firearm and provide immediate feedback to the user.

Figure 4:
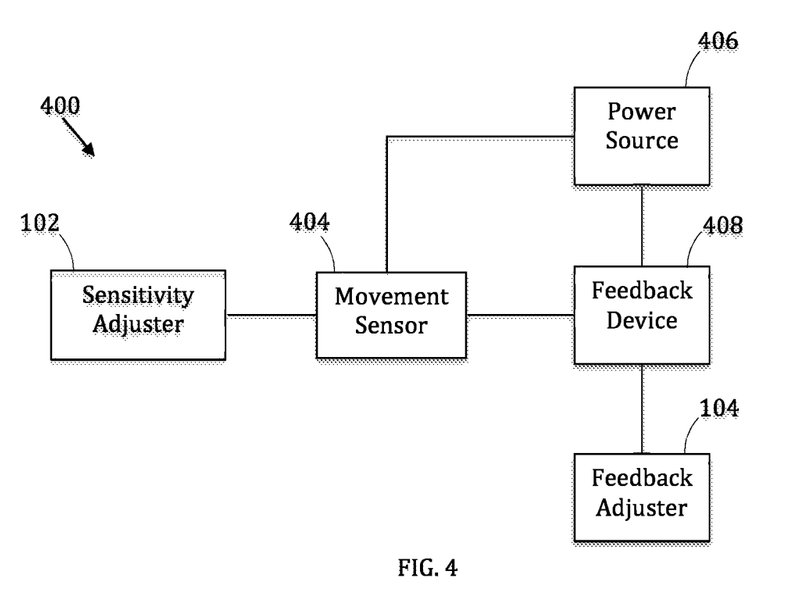
FIG. 4 is a diagram of the structure of a firearm stabilizing training device.

Referring now to FIG. 4, a non-limiting block diagram of the structure of a device implemented according to this disclosure is provided. A device 400 comprises a movement sensor 404, a feedback device 408, and a power source 406. The device may further comprise a sensitivity adjustor 102 and a feedback adjuster 104. The movement sensor 404 is configured to detect movement of the firearm. The sensitivity adjuster 102 may be coupled to the movement sensor 404, and allow the user to select the threshold level of the movement sensor 404. The feedback device 408 is operably coupled to the movement sensor 404. When the detected movement exceeds a threshold level, predetermined and fixed or predetermined as set through the sensitivity adjuster, the feedback device 408 is activated and emits audio and/or visual feedback, which alerts the user. When the movement falls below the threshold level, the feedback device 408 is deactivated. The characteristics of the feedback may correspond to a pattern of the movement or may include varied intensities based on the intensity of the movement and multiple predetermined thresholds or interrelated threshold levels. The feedback adjuster 104 may be coupled to the feedback device 408 and allows the user to adjust the characteristics of the feedback. The power source 406 is coupled to the movement sensor 404 and the feedback device 408. In one or more embodiments, the power source 406 is electrically coupled to the movement sensor 404 and the feedback device 408.

A movement sensor is configured to detect movement of the firearm. Movement sensors may comprise a gyroscope, accelerometer, a piezoelectric sensor, and/or any combination thereof. In combination with other aspects of a firearm stabilizing training device, a movement sensor allows the firearm stabilizing training device to give audio and/or visual feedback to assist in the training of a user to recognize and reduce movement in his/her handling of a firearm.

The sensitivity or the amount of movement detected by the movement sensor for the movement to activate the firearm stabilizing training device may be adjustable by the user through a sensitivity adjuster, for example by manually turning a dial or adjusting a level through manual or digital buttons. The amount of movement acceptable before any audio or visual feedback is emitted from the firearm stabilizing training device may be adjusted by the user for the user's particular skill level or preferences. By allowing a user to adjust the sensitivity of the movement sensor, a user may customize the firearm stabilizing training device to his/her specific needs of level of expertise, thus allowing the user to gradually improve his/her marksmanship.

Thus, one or more embodiments of a firearm stabilizing training device comprise a sensitivity adjuster. An exemplary sensitivity adjuster 102 is depicted in FIG. 1. The sensitivity adjuster may comprise a dial, slider, button or other adjuster on the device and accessible to the user for manual operation. The sensitivity adjuster may be operably or electrically coupled to the movement sensor such that adjustment of the sensitivity adjuster adjusts the level at which the audio and/or visual feedback is emitted in response to certain amounts of movement or certain movements detected by the movement sensor.

One or more embodiments of a firearm stabilizing training device comprise an audio feedback device. The audio feedback device may comprise any audio feedback device, and is configured to emit audio feedback when the conditions and for the time durations of the predetermined threshold settings are satisfied. The audio feedback device is operably or electrically coupled to the movement sensor such that the audio feedback device is activated and emits audio feedback responsive to movement detected by the movement sensor when the movement exceeds a threshold level. The audio feedback device is deactivated when the movement falls below the threshold. The audio feedback threshold may be established as a fixed predetermined level or a predetermined level determined by adjustment of the sensitivity level selected by the user through the sensitivity adjuster.

Audio feedback devices may be as simple as a speaker or buzzer, or more complicated sound generator to emit particular sounds in response to particular movements or movement patterns detected by the movement sensor. In some embodiments, the intensity or volume of audio feedback emitted by the audio feedback device may be dependent upon and directly correlated with the amount of movement detected by the movement sensor. For example, more movement detected by the movement sensor may cause a louder audio feedback than less movement detected by the movement sensor. In the same or other embodiments, more movement detected by the movement sensor may alter the pitch or sound pattern of the audio feedback device when compared with less movement detected. In some embodiments, the device may further comprise an audio feedback selector and, using the audio feedback selector, a user may select whether the audio feedback is correlated with the amount of movement detected by the movement sensor and in what ways. An exemplary audio feedback selector 106 is depicted in FIG. 1.

According to some aspects, a user may select the volume and/or tone type of audio feedback emitted by the audio feedback device upon detection of movement by the movement sensor. For example, a firearm stabilizing training device may comprise a volume adjuster operably or electrically coupled to the audio feedback device, and/or the movement sensor and configured to adjust the volume, frequency, and/or tone type of the audio feedback emitted by the audio feedback device. The volume adjuster may comprise a dial, slider, button or any other adjuster known in the art. An exemplary volume adjuster 104 is depicted in FIG. 1.

One or more embodiments of a firearm stabilizing training device comprises a visual feedback device. The visual feedback device is operably or electrically coupled to the movement sensor such that the visual feedback device is activated and emits visual feedback responsive to movement detected by the movement sensor. The visual feedback device may comprise one or more light emitting diodes, a sight laser 210 coupled to the power source, or an array of lights. As noted above, a firearm stabilizing training device is configured such that the visual feedback device may be activated and emit visual feedback only when movement is beyond a fixed predetermined threshold level, a threshold level predetermined by adjustment of the sensitivity level selected by the user through the sensitivity adjuster, or upon sensing the other conditions described above in relation to the audio feedback device. The visual feedback device is activated when the movement exceeds the threshold level. In some embodiments, the brightness, intensity, color, and/or light pattern of visual feedback emitted by the visual feedback device is dependent upon and directly correlated with the amount of movement detected by the movement sensor. For example, more movement detected by the movement sensor may cause a brighter or different colored visual feedback than less movement detected by the movement sensor depending upon the settings of the device. In some embodiments, a user may determine whether the visual feedback is correlated with the amount of movement detected by the movement sensor and in what ways.

One or more embodiments of a firearm stabilizing training device comprises a charging port. An exemplary charging port 302 is depicted in FIG. 3. The charging port is configured to removably couple to an external power source and is electrically coupled to the feedback device, the movement sensor, and the power source. The power source, which may comprise a battery housed within the firearm stabilizing training device, stores energy received through the charging port. In some non-limiting embodiments, the charging port may comprise a USB charger. In some embodiments, the charging port may be configured to couple the firearm stabilizing training device to another device, such as a computer, with a wired coupling to transfer data between the firearm stabilizing device and the computer.

One or more embodiments of a firearm stabilizing training device comprises an on/off button or switch 108 (FIG. 1). The on/off button or switch 108 is configured to activate and deactivate the firearm stabilizing training device. As such, the on/off button or switch 108 is operably or electrically coupled to the audio feedback device, the visual feedback device, the movement sensor, and the power source.

In one or more embodiments, a firearm stabilizing training device may further comprise a level sensor operably coupled to the movement sensor, that is configured to deactivate, or cause to not activate at all, audio or visual feedback when the firearm is above or below a certain angle of incline measured by the level sensor, even when movement is detected. For example, in some embodiments, if the firearm is angled plus or minus 25 degrees from horizontal, the firearm stabilizing training device is configured to not activate, or to deactivate, the audio or visual feedback. In some embodiments, a user may adjust the angle at which the audio and/or visual feedback is deactivated. For example, a user may select to deactivate the audio and/or visual feedback when the firearm is angled plus or minus 5, 10, 15, 20, 25, 30, 35, 40, 45, 50, and so on, degrees from horizontal. Such a configuration allows a user to disable or deactivate the audio and/or visual feedback when the firearm is holstered and/or pointed in non-shooting positions. In some embodiments, a controller for the firearm stabilizing training device turns the firearm stabilizing training device off if the device is not in use or no movement is detected for a predetermined or preset period of time.

Although much of the connecting circuitry interrelating the movement sensor, sensitivity adjustor, power source, feedback device and feedback adjuster may be formed from analog circuit components by those of ordinary skill in the art, one or more embodiments of a firearm stabilizing training device may further comprise a processor. The processor may be coupled to the movement sensor and the feedback device. The processor may comprise any computer processor known in the art. A processor may be configured, with input from the movement sensor, to determine whether movement is associated with recoil after firing or movement of the firearm before firing. A firearm stabilizing training device may further comprise memory operably coupled to the processor. The memory may be configured to store or record historical movements of the firearm associated with the recoil, movements before and/or after the recoil of the firearm, and general operation of the firearm stabilizing training device. In some embodiments, the firearm stabilizing training device alerts the user after a shot is fired based on device settings related to the movement of the firearm stabilizing training device within a particular time interval before the shot. The movement sensor in such configurations would measure movement sensed and store movement data in memory. Once movement is sensed that indicates a shot was fired, the processor analyzes the movement just before the shot to determine whether the user flinched or jerked before the shot based on the movement sensed that exceeds a predetermined threshold or acceptable amount. Those of ordinary skill in the art will readily understand how to analyze the stored data to indicate relevant information from the pre-shot and shot data stored in the memory. Additionally, in particular embodiments, the device continues to sense movement after the shot is fired and provides relevant audio and/or visual feedback.

One or more embodiments of a firearm stabilizing training device may further comprise a wireless transmitter operatively associated with the processor. The wireless transmitter may comprise any wireless transmitter known in the art, such as but not limited to a Wi-Fi, Bluetooth, or other radio frequency transmitting devices known in the art. In some embodiments, the wireless transmitter is configured to operably couple to an external device or processor, such as but not limited to a computer or smart phone running a software application configured to receive and/or analyze and display the received data. In some embodiments, the wireless transmitter is configured to transfer data recorded on the memory to an external device. In such configurations, movement of the firearm may be tracked and/or recorded in real time, or recorded and displayed afterwards, on an external device.

One or more embodiments of a firearm stabilizing training device is configured to provide randomized or predetermined intervals of audio and/or visual feedback. Such randomized or predetermined intervals of audio and/or visual feedback may be unassociated with movement detected by the movement sensor, but rather as part of a practice or game strategy for the user. For example, the audio or visual feedback device may emit audio and/or visual feedback at a randomized time. Upon emission of the audio or visual feedback signal, a user may draw and/or fire the firearm. In some embodiments, the processor is configured to record the time between the audio or visual feedback and the firing of the firearm, the angle of the firearm at the time of the audio or visual feedback, and/or the angle of the firearm at the time of firing the firearm. In such embodiments, a firearm stabilizing training device may comprise a mode switch to change the firearm stabilizing training device from practice mode (wherein movement is sensed and audio or visual feedback is emitted responsive to sensed movement) to a game mode (wherein audio or visual feedback is emitted responsive to a signal from the processor irrespective of the movement sensor). In some embodiments, the processor is configured to both cause the feedback of the firearm stabilizing training device to emit feedback to indicate to the user to draw the firearm and track the movement before firing.

Figure 5:
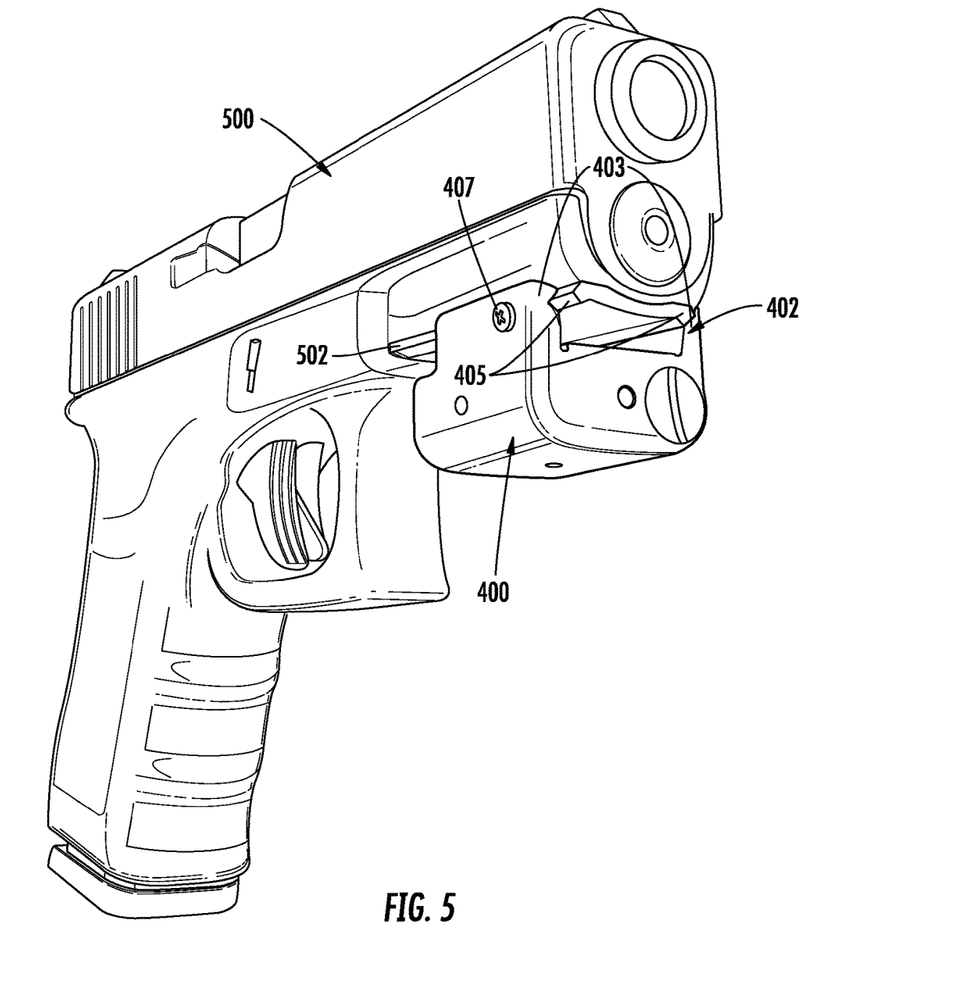
FIG. 5 is a firearm mounted with a firearm stabilizing training device.

Moreover, as shall be described in greater detail below, various embodiments of a firearm stabilizing training device 400 of this disclosure are adapted to mount or retrofit to a variety of firearms 500 previously known in the art. FIG. 5 depicts a non-limiting embodiment of a firearm stabilizing training device 400 implemented according to this disclosure being mounted to a firearm 500. In the embodiment of FIG. 5, the firearm stabilizing training device 400 is mounted to the Picatinny rail 502 of a firearm 500. The device 400 may comprise first and second arms 405, a channel 402 on each arm with protrusions 403 sized and shaped to mate with the Picatinny rail 502 of the firearm 500. The protrusions 403 of the channel 402 is in such shape that the channel 402 can be fitted onto the Picatinny rail 502 and the device 400 can be mounted onto the firearm 500 by sliding the device 400 along the Picatinny rail 502. The device may further comprise a securing element 407, such as set screw 407. After being mounted, the device 400 may be restricted from moving relative to the firearm 500 through the securing element 407. The securing element 407 may be screws that can be tightened, Velcro straps that can be fastened around a portion of the device, and/or any other mechanism known in the art that can be used to secure one object with another. Although it is particularly useful to mount the firearm stabilizing training device to the rail of a firearm, it may alternatively be mounted at other locations depending upon the particular firearm style and needs of the user.

In one or more embodiments, the firearm stabilizing device 200 (FIG. 2) may comprise a clamp that can be used to mount the device onto a firearm. A non-limiting exemplary clamp 202 is depicted in FIG. 2A. The clamp may comprise clamp arms 204 with protrusions 212, a pivoting element 206, and an actuating element 208. The shapes of the protrusions 212 on the clamp arms 204 allow them to be fitted onto the Picatinny rail or to another portion of the firearm. To mount the device onto a firearm, a force is applied to the actuating element 208, and the actuating element 208 becomes loaded and causes the clamp arms 204 to open and be fitted onto the Picatinny rail. When mounted, the device 200 movement is resisted from moving relative to the Picatinny rail through the force of the biased pivoting element 206 biasing one of the clamp arms 204 toward the other. To dismount the device 200 from the firearm, a force is applied to the actuating element 208, which causes the clamp arms 204 to open (FIG. 2B) and release the Picatinny rail.

Although the embodiment described herein primarily illustrate a device that is separate from a firearm and couples to the firearm, it is contemplated that the device may be built into the firearm when the firearm is manufactured by incorporating it into the housing of the firearm or more permanently coupling the device to the firearm. Additionally, it is contemplated that a practice weapon (e.g. firearm that shoots blanks, a fake gun or simulated weapon for training, or simply a weapon used only for practicing holding it still during preparations for and shooting the weapon). Both firearms and practice weapons are shooting instruments whether they actually release a bullet or not, and whether they actually fire or not.

It should also be clear from this disclosure that the particular timing of movement sensing and provision of feedback is not limited to a particular time doing the shooting process. There are advantages to providing motion feedback prior to "lock on" the target, after lock-on to shooting, and after shooting. Any of the feedback examples provided herein may be provided with its own set of relative thresholds and feedback types for any time during a shooting process or training for a shooting process. By providing immediate real-time feedback to the user, the user can more quickly adjust and realize the changes that need to be made during the current shot or shot simulation rather than only after the shot has been made.

Although the device and method disclosed in this application can be used with a firearm, the device and method is not limited to be used on firearms. It can be mounted onto a bow or any other shooting instruments, where a user can use the device to improve his/her shooting accuracy.

Figure 6:
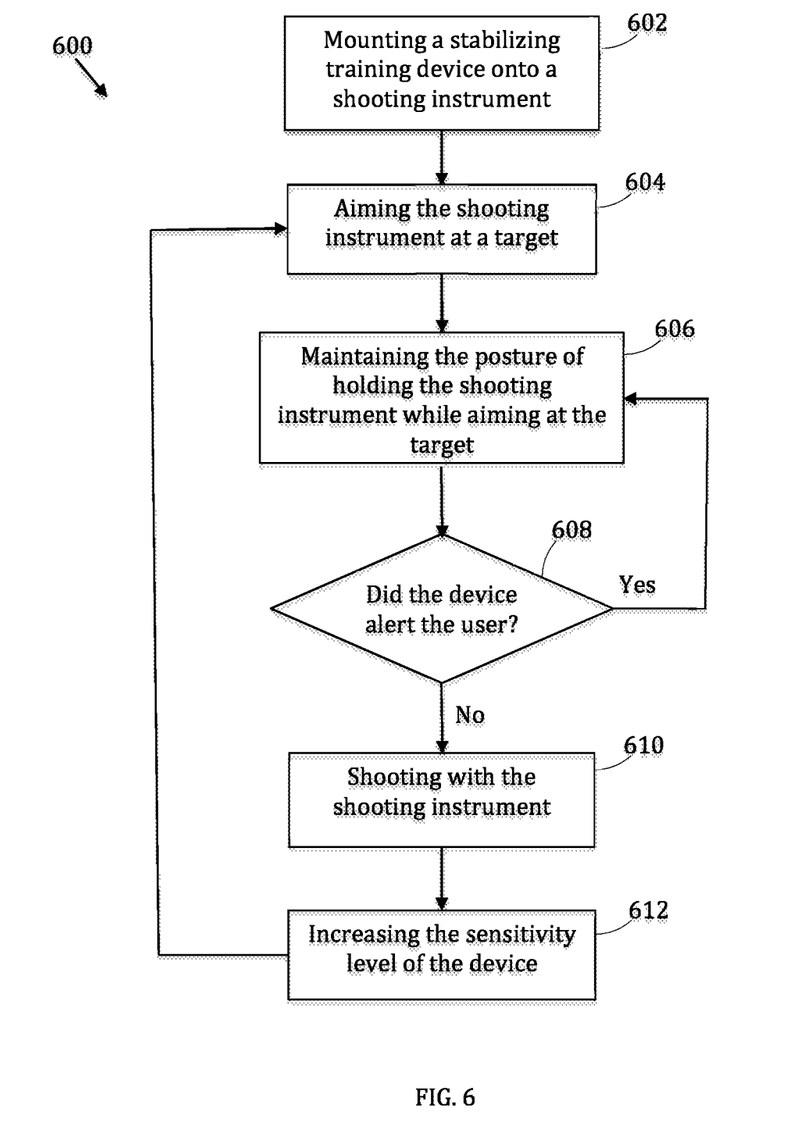
FIG. 6 is a flow chart illustrating a method of using a training device to learn to stabilize a shooting instrument.

Referring now to FIG. 6, a flow chart depicting a method 600 of using a training device to learn to stabilize a shooting instrument is provided. The shooting instrument may be any firearm, such as a handgun, a practice weapon, a rifle, a bow and arrow, or any other instruments used to shoot a target. At step 602, the user mounts a stabilizing training device onto the shooting instrument. At step 604, the user aims the shooting instrument at a target. At step 606, the user maintains the posture of holding the shooting instrument while aiming at the target. Step 606 is repeated until the device does not alert the user about an undesired movement of the shooting instrument at step 608. At step 610, the user shoots with the shooting instrument. At step 612, the user optionally increases or decreases the sensitivity level of the stabilizing training device and repeats steps 604 to 610, or repeats steps 604-610 until the user desires to increase or decrease the sensitivity.

Figure 7:
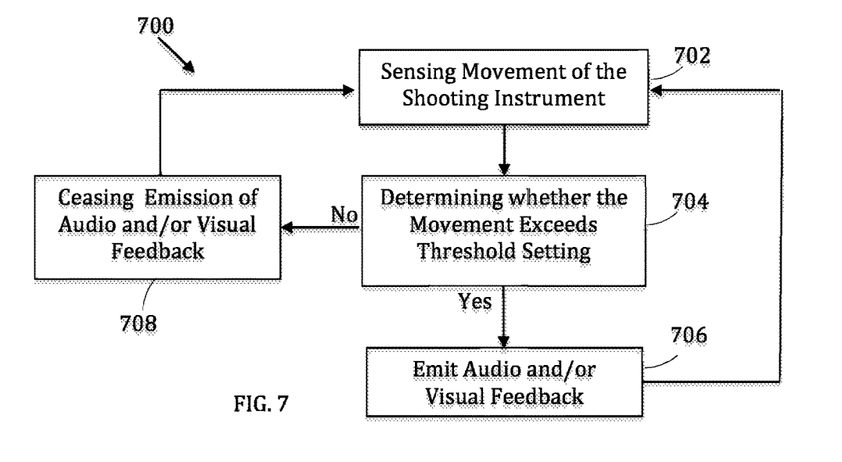
FIG. 7 is a flow chart illustrating a method of training a user to stabilize a shooting instrument.

Referring now to FIG. 7, a flow chart depicting a method 700 of training a user to stabilize a shooting instrument is provided. This method is a non-limiting example of the method utilizing components and any of the embodiments of a training device described elsewhere in this disclosure. Those of ordinary skill in the art will readily understand how the method may be applied to the training devices disclosed herein. The shooting instrument may be any firearm, such as a handgun, practice weapon, a rifle, a bow and arrow, or any other instruments used to shoot a target. The training device is mounted to or incorporated within a housing of the shooting instrument. At step 702, a movement sensor of the training device senses movement of the shooting instrument. At step 704, the training device determines whether the sensed movement of the shooting instrument exceeds a predetermined threshold setting. At step 706, in response to the sensed movement that exceeds the predetermined threshold, a feedback device is activated to emit at least one of an audio and a visual feedback to the user while the movement is sensed. The audio and/or visual feedback emitted from the feedback device may comprise a feedback characteristic that corresponds to a pattern of the movement sensed. At step 708, in response to the sensed movement that falls below the predetermined threshold, the feedback device is deactivated to cease emission of the audio and/or visual feedback to the user. Deactivating the emission of the feedback may involve completely deactivating any emission of feedback, such as the sound notice turning off, or may involve merely ceasing one type of feedback and changing it for another feedback, such as a light changing from red to green or from a fast blink to a slow blink or a steady on light, or a comparable change in an audible feedback. The process is continually repeated as the training device provides the user with immediate, real-time feedback of the user's current movement of the shooting instrument to assist the user in reducing undesired movement while the user is actually practicing with the shooting instrument. In particular embodiments, the sensitivity of the motion sensor may be adjusted in response to an input from the user, to increase or decrease the sensitivity level for a particular user or shooting instrument. The remaining steps 702-708 are then repeated under the new sensitivity settings.

It will be understood that implementations are not limited to the specific components disclosed herein, as virtually any components consistent with the intended operation of a method and/or system implementation for firearm stabilizing training device may be utilized. Many additional components and operation procedures known in the art consistent with the intended firearm stabilizing training device and/or operation procedures for a firearm stabilizing training device will become apparent for use with implementations of firearm stabilizing training devices from this disclosure. Accordingly, for example, although particular firearm stabilizing training device may be disclosed, such components may comprise any shape, size, style, type, model, version, class, grade, measurement, concentration, material, weight, quantity, and/or the like consistent with the intended operation of a method and/or system implementation for a firearm stabilizing training device may be used, consistent with the intended operation of firearm stabilizing training devices. In places where the description above refers to particular implementations of firearm stabilizing training device, it should be readily apparent that a number of modifications may be made without departing from the spirit thereof and that these implementations may be applied to other firearm stabilizing training devices.

The invention claimed is:

1. A device for stabilizing a firearm or practice weapon while a user practices firing the firearm or practice weapon, the device comprising:
   a movement sensor configured to detect a movement of the device;
   a sensitivity adjuster operably coupled to the movement sensor and adjustable to allow a user to adjust a sensitivity level of the movement sensor;
   a feedback device operably coupled to the movement sensor and configured to emit an audio or a visual feedback to the user responsive to the movement while the movement is detected, wherein the feedback device is activated when the movement exceeds a threshold level determined by the sensitivity level and deactivated when the movement falls below the threshold, and wherein the audio or visual feedback comprises a feedback characteristic that corresponds to a pattern of the movement;
   a feedback adjuster operably coupled to the feedback device and adjustable to allow the user to adjust the feedback characteristic;
   a level sensor operably coupled to the movement sensor to deactivate the movement sensor when an angle of the device is outside a predetermined incline angle range; and
   a power source electrically coupled to the movement sensor and the feedback device.

2. The device of claim 1, wherein the feedback characteristic comprises a volume, a pitch, or a sound pattern of the audio feedback.

3. The device of claim 1, wherein the feedback characteristic comprises at least one of a brightness, an intensity, a color, and a light pattern of the visual feedback.

4. The device of claim 1, wherein
   the feedback adjuster comprises a sound adjuster, and
   the feedback characteristic comprises at least one of a volume, a frequency, and a tone of the audio feedback.

5. The device of claim 1, further comprising a charging port, wherein
   the charging port is removably coupled to an external power source, and electrically coupled to the movement sensor, the feedback device, and the power source, and
   the power source stores an energy received through the charging port.

6. The device of claim 1, further comprising opposing protrusions extending therefrom, wherein shapes of the protrusions allow the protrusions to be fitted onto a Picatinny rail of the firearm or practice weapon, the device is mounted onto the firearm or practice weapon by placing the protrusions on opposing sides of the Picatinny rail and, after being mounted, the device is restricted from moving relative to the Picatinny rail by a securing element extending through the device adjacent to at least one of the protrusions.

7. The device of claim 1, further comprising a clamp, wherein the clamp comprises protrusions extending inward from clamp arms, a biased pivoting element coupled between at least one of the clamp arms and an actuating element, wherein shapes of the protrusions allow the protrusions to be fitted onto a Picatinny rail of the firearm or practice weapon, when the device is mounted, the device is restricted from moving relative to the Picatinny rail by inward forces exerted upon the Picatinny rail by the biased pivoting element through the at least one of the clamp arms.

8. The device of claim 1, further comprising a wireless communication device coupled to the motion sensor.

9. The device of claim 1, further comprising a mode switch, wherein the movement sensor is activated when the mode switch is set at a practice mode, and the movement sensor is deactivated when the mode switch is set at a game mode, wherein the audio feedback or the visual feedback is emitted in a randomized interval or a predetermined interval.

10. The device of claim 1, further comprising a sight laser coupled to the power source.

11. The device of claim 1, further comprising an incline angle adjustor operably coupled to the level sensor and adjustable to allow the user to adjust the predetermined incline angle range.

12. The device of claim 1, wherein the device is configured to be deactivated when the movement sensor detects no movement for a predetermined period of time or a second period of time set by the user.

13. A device for stabilizing a shooting instrument while a user practices firing the shooting instrument, the device comprising:
   a movement sensor configured to detect a movement of the device;
   a feedback device operably coupled to the movement sensor and configured to emit at least one of an audio and a visual feedback to the user responsive to the movement while the movement is detected, wherein the feedback device is activated when the movement exceeds a predetermined threshold, and is deactivated when the movement falls below the predetermined threshold, and the at least one of the audio and the visual feedback comprises a feedback characteristic that corresponds to a pattern of the movement; and
   a level sensor operably coupled to the movement sensor to deactivate the movement sensor when an angle of the device is outside a predetermined incline angle range;
   wherein the movement sensor and the feedback device are configured to receive power from a power source.

14. The device of claim 13, further comprising a clamp, wherein the clamp comprises protrusions on clamp arms joined through an inwardly biased pivoting element, and a clamp actuating element, and shapes of the protrusions allow the protrusions to be fitted onto a Picatinny rail of the shooting instrument.

15. The device of claim 13, further comprising a sight laser configured to couple to the power source.

16. The device of claim 13, wherein the device is configured to be deactivated when the movement sensor detects no movement for a predetermined period of time or a second period of time set by the user.

17. The device of claim 13, further comprising a charging port, wherein the charging port is configured to removably couple to an external power source, and is electrically coupled to the movement sensor, the feedback device, and the power source, the device further comprising a rechargeable power source configured to store energy received through the charging port.

18. A method of training a user to stabilize a shooting instrument while the user shoots with the shooting instrument, the method comprising:

sensing movement of the shooting instrument through a stabilizing training device coupled to the shooting instrument;

determining whether the sensed movement of the shooting instrument exceeds a predetermined threshold;

activating a feedback device operably coupled to the movement sensor to emit at least one of an audio and a visual feedback to the user while the movement is sensed, responsive to the sensed movement exceeding the predetermined threshold;

deactivating the feedback device to cease emission of the at least one of the audio and the visual feedback to the user if the sensed movement falls below the predetermined threshold;

wherein the at least one of the audio and the visual feedback comprises a feedback characteristic that corresponds to a pattern of the movement; and deactivating the movement sensor when an angle of the device is outside a predetermined incline angle range.

* * * * *